US009691052B2

(12) United States Patent
Tang

(10) Patent No.: US 9,691,052 B2
(45) Date of Patent: Jun. 27, 2017

(54) METHOD, A SYSTEM AND A SERVER FOR BUSINESS APPOINTMENT SCHEDULING USING TEXT MESSAGES

(71) Applicant: Yilissa Tang, Plano, TX (US)

(72) Inventor: Yilissa Tang, Plano, TX (US)

( * ) Notice: Subject to any disclaimer, the term of this patent is extended or adjusted under 35 U.S.C. 154(b) by 231 days.

(21) Appl. No.: 14/472,093

(22) Filed: Aug. 28, 2014

(65) Prior Publication Data
US 2015/0081371 A1    Mar. 19, 2015

Related U.S. Application Data

(60) Provisional application No. 61/878,586, filed on Sep. 16, 2013.

(51) Int. Cl.
*G06Q 10/02*        (2012.01)
*G06Q 10/10*        (2012.01)
*H04W 4/12*         (2009.01)
*G06Q 10/06*        (2012.01)

(52) U.S. Cl.
CPC ... *G06Q 10/1095* (2013.01); *G06Q 10/06315* (2013.01); *H04W 4/12* (2013.01)

(58) Field of Classification Search
CPC ............ G06Q 10/109; G06Q 10/1091; G06Q 10/1093; G06Q 10/1095; G06Q 10/06315; G06Q 10/02; G06Q 10/10; H04W 4/12
USPC ......... 705/7.18, 7.19, 1.1, 2, 3, 4, 5, 6, 7.11, 705/7.12, 7.13, 7.14, 7.15, 7.16, 7.17, 7.1, 705/9, 7.21, 7.24, 7.25, 311, 313, 319
See application file for complete search history.

(56) References Cited

U.S. PATENT DOCUMENTS

| | | | | |
|---|---|---|---|---|
| 8,595,046 B1* | 11/2013 | Christian | ............... | G06Q 10/02 705/7.18 |
| 2009/0028306 A1* | 1/2009 | Rhie | ................... | H04L 12/5835 379/93.01 |
| 2011/0123005 A1* | 5/2011 | Segall | ............... | H04M 3/42382 379/88.13 |
| 2011/0136516 A1* | 6/2011 | Ellis | ........................ | H04W 4/14 455/458 |
| 2012/0253931 A1* | 10/2012 | Connolly | ........... | G06Q 30/0207 705/14.53 |
| 2014/0052463 A1* | 2/2014 | Cashman | ............... | G06Q 20/18 705/2 |

* cited by examiner

Primary Examiner — Igor Borissov
(74) Attorney, Agent, or Firm — Garlick & Markison; Edward J. Marshall

(57) ABSTRACT

The present disclosure relates to a method, a system and a server using text messages for scheduling of business appointments. A server receives an initial text message having been transmitted over a wireless network by a mobile terminal. The initial text message includes a function keyword. Based on the function keyword, the server determines a type of requested service and creates a unique page identification for a scheduler page. The server transmits toward the mobile terminal over the wireless network, a reply text message including the unique page identification. The server detects an access of the scheduler page by the mobile terminal, the access including an entry of appointment data. An appointment is scheduled in the scheduler page, using the entered appointment data.

20 Claims, 10 Drawing Sheets

System Overview

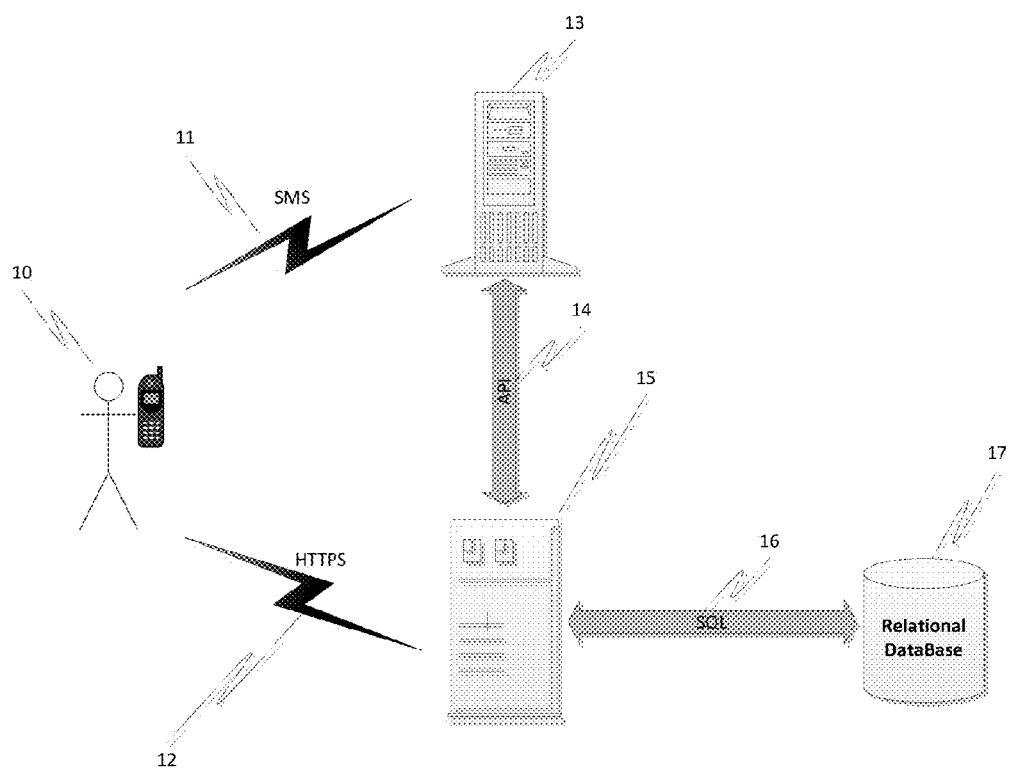
Figure 1: System Overview

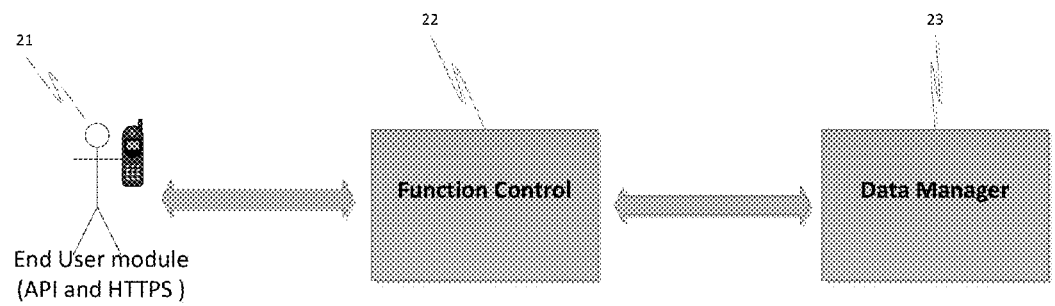
Figure 2: Software Modules in Web
Application Server 15

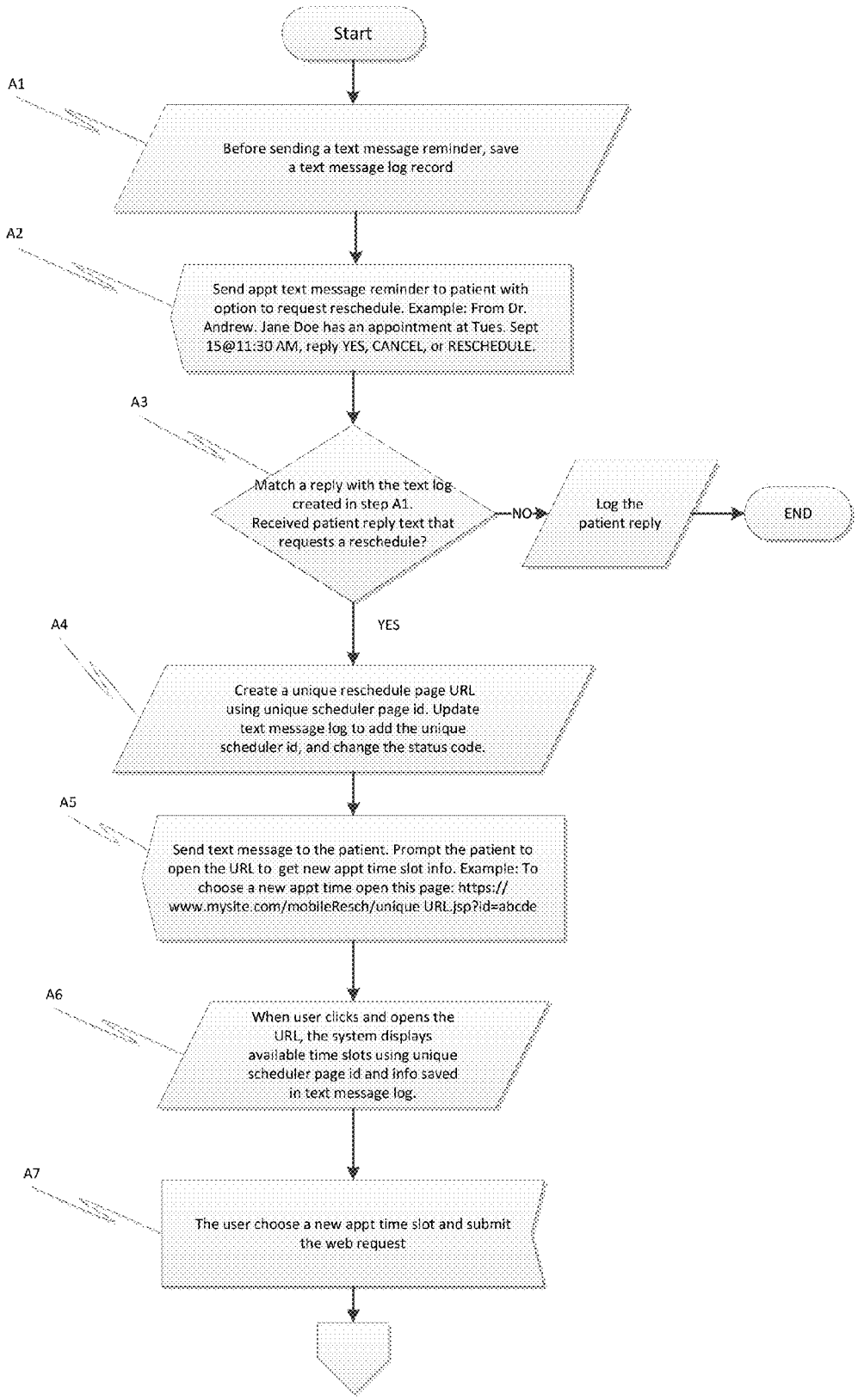
Figure 3A: Reschedule on text reminder, part 1

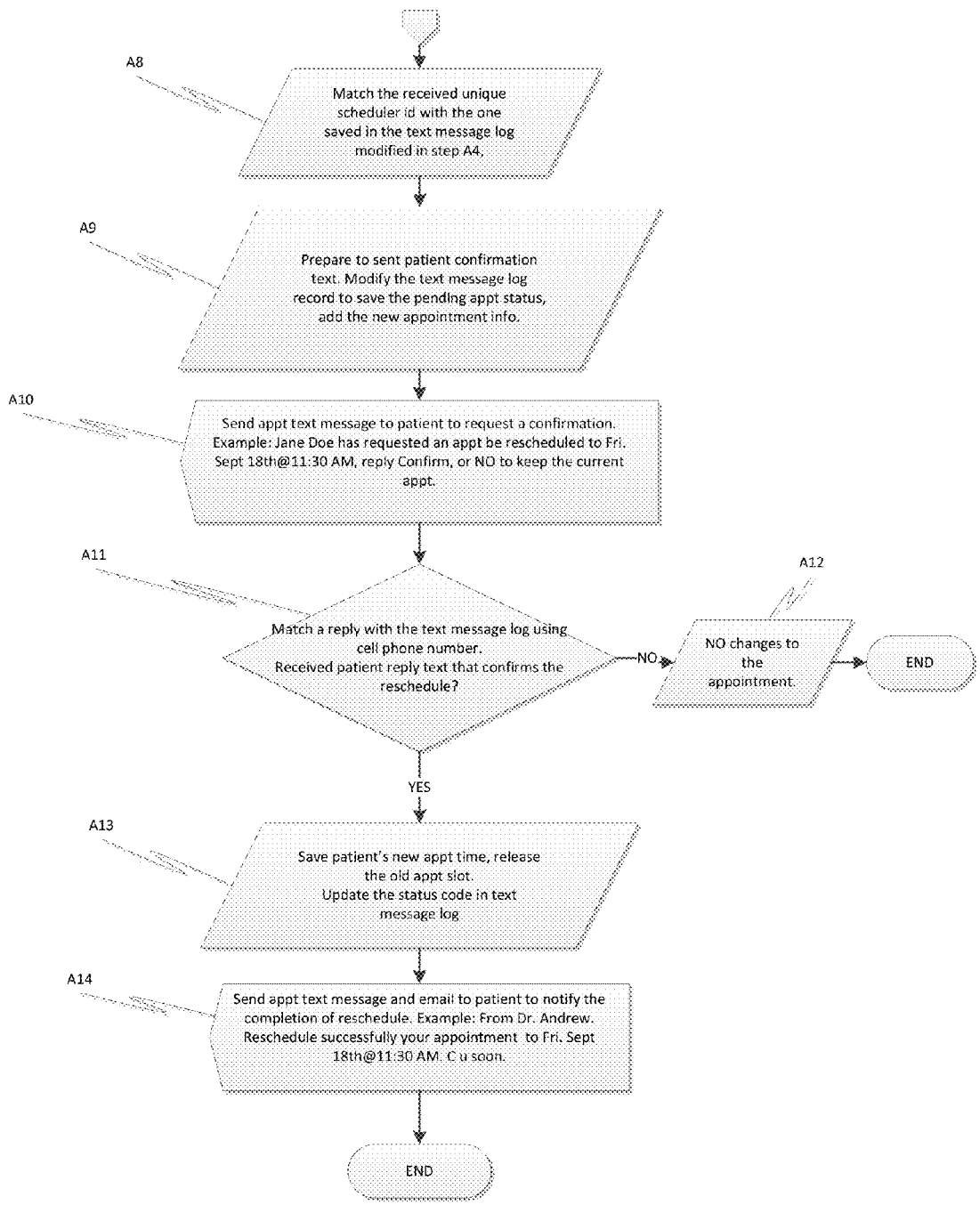
Figure 3B: Reschedule on text reminder, part 2

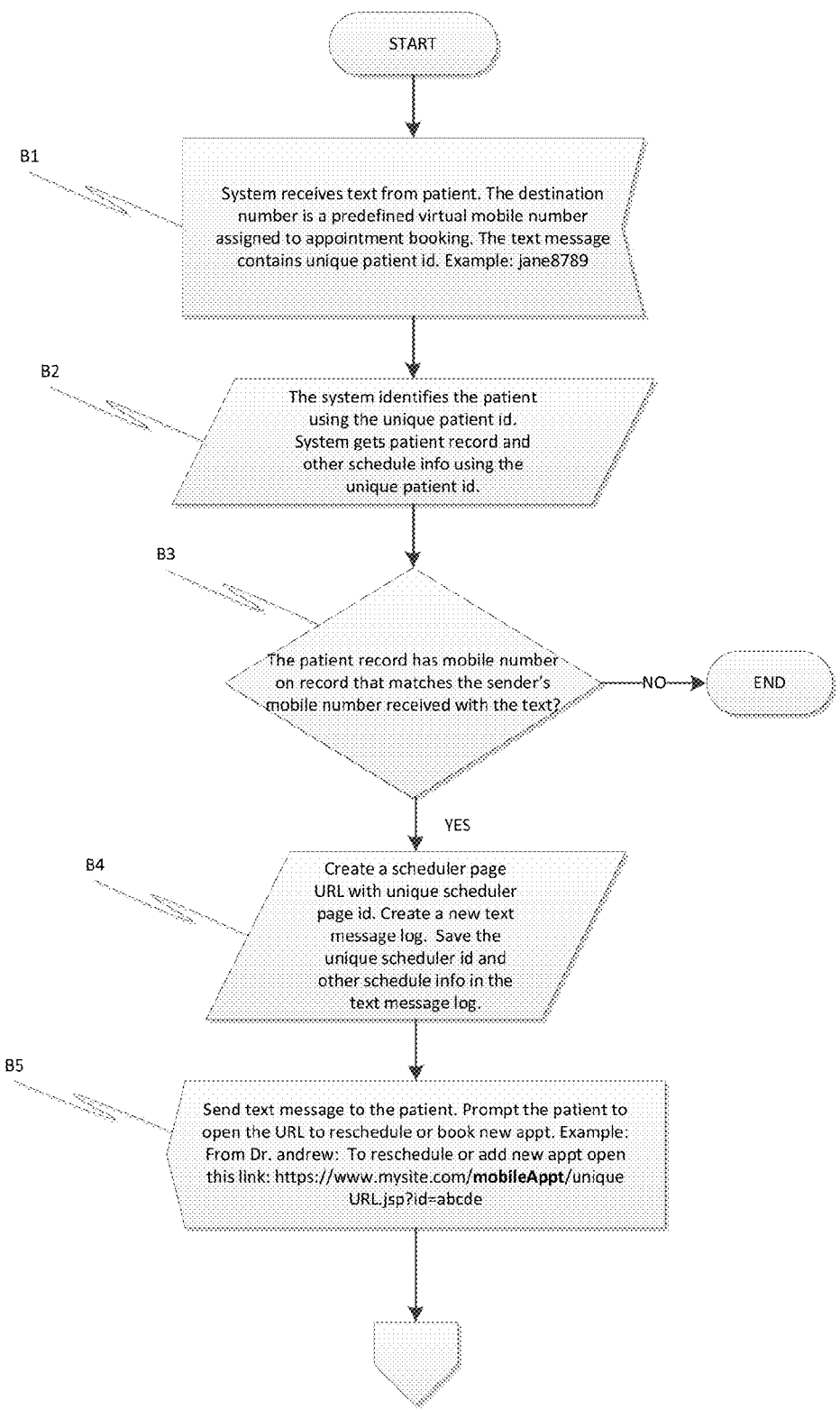
Fig 4A: Existing patient appointment by Text, part 1

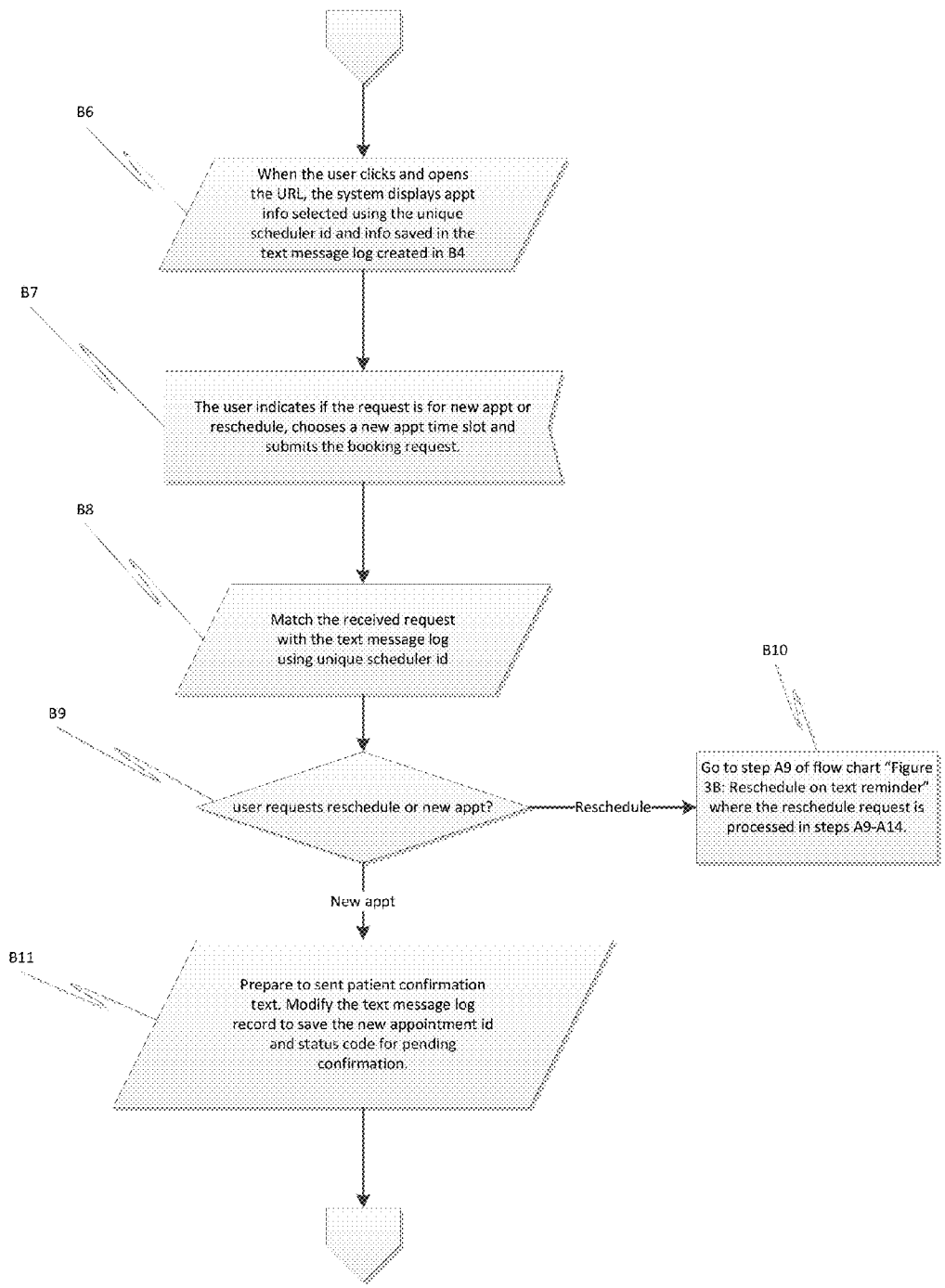
Figure 4B: Existing patient appointment by Text, part 2

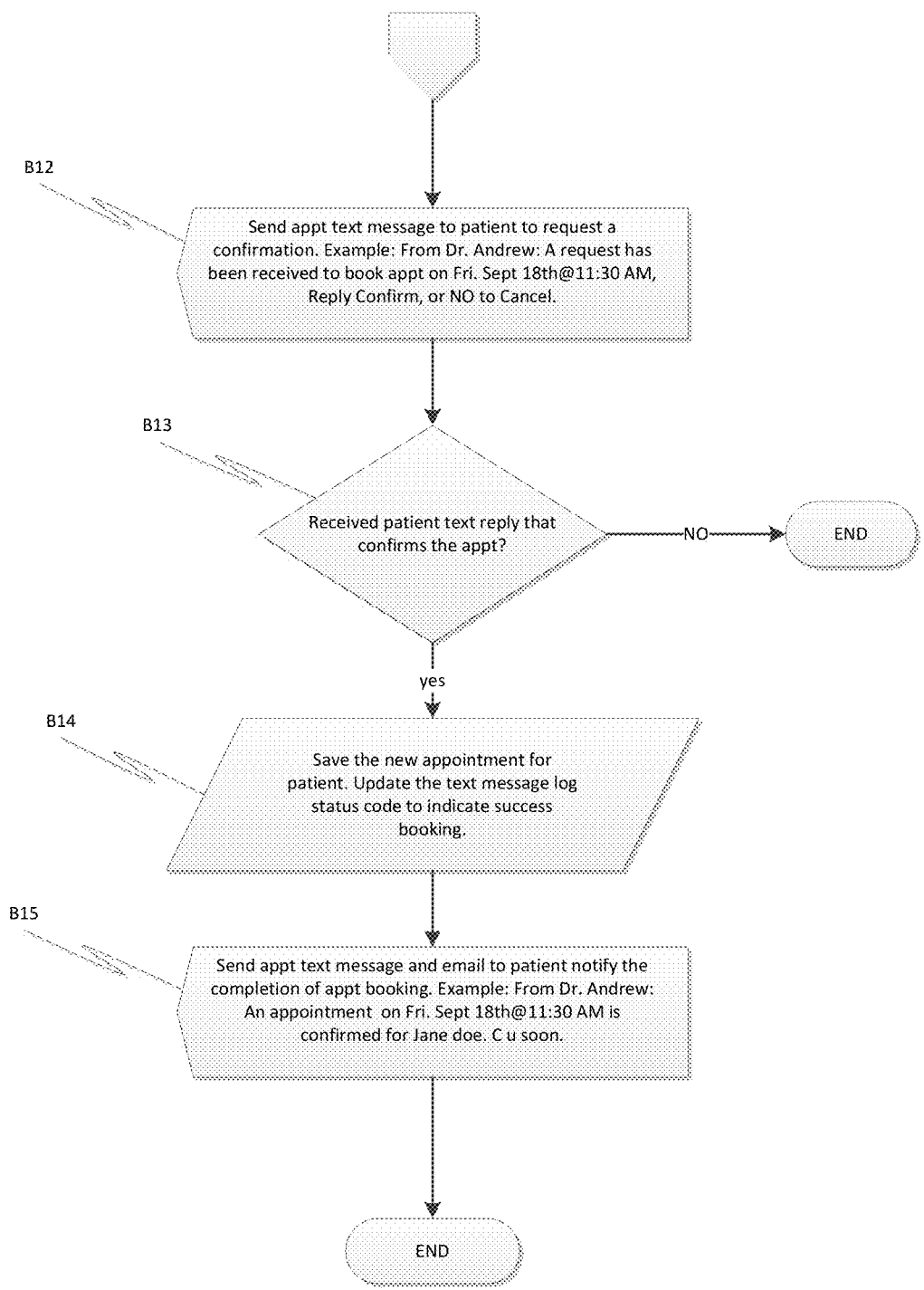
Figure 4C: Existing patient appointment by Text, part 3

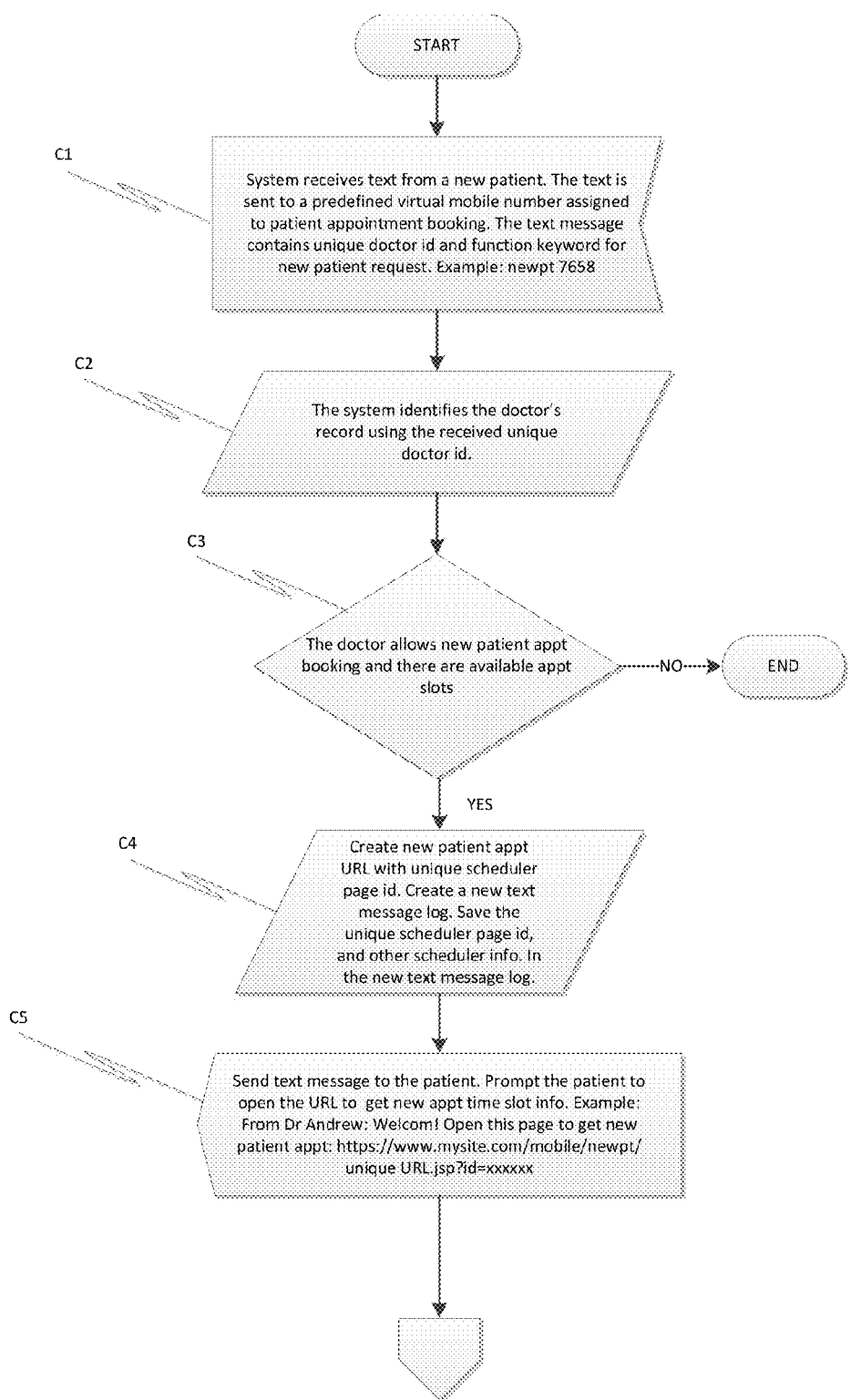
Figure 5A: New pateint appointment by text, part 1

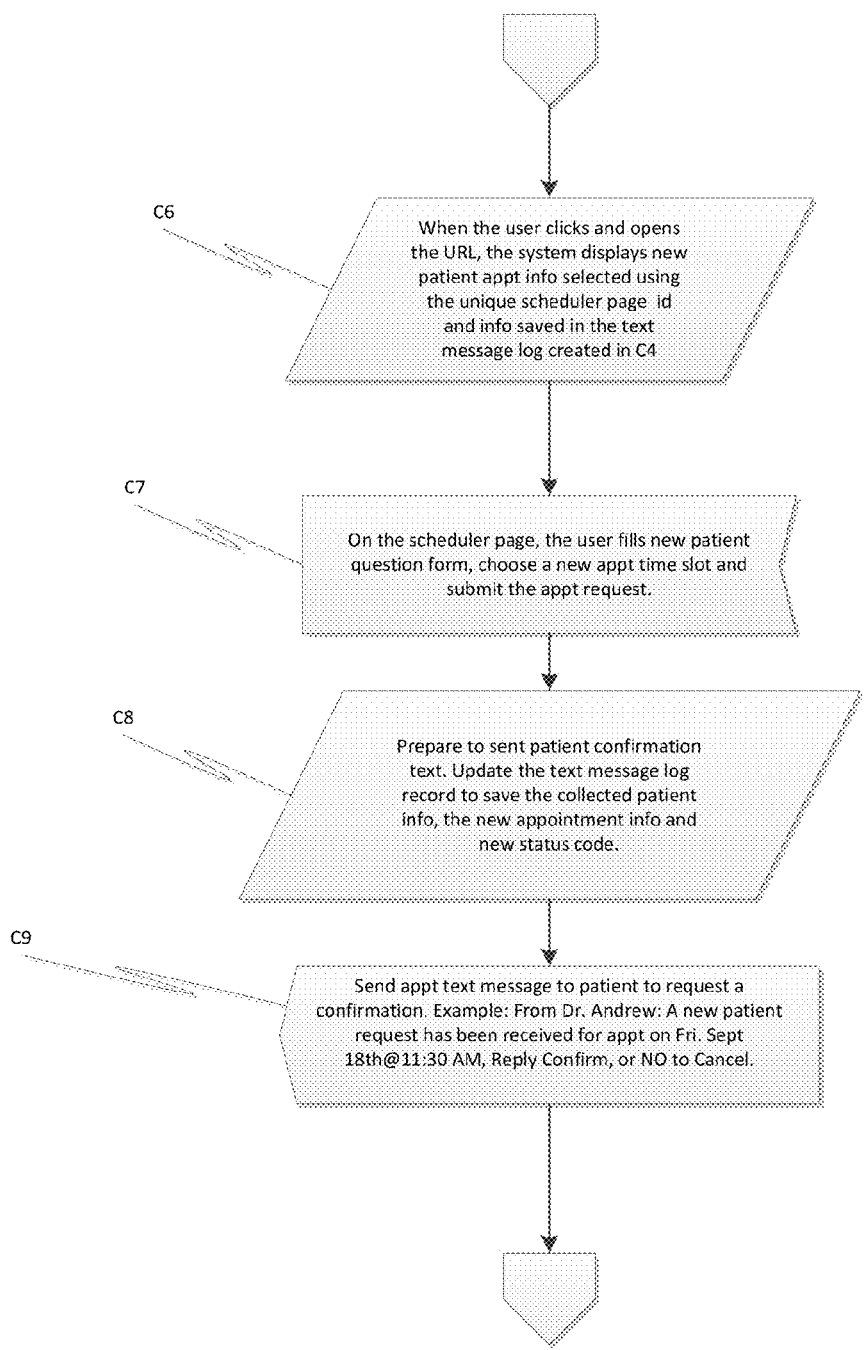
Figure 5B: New pateint appointment by text, part 2

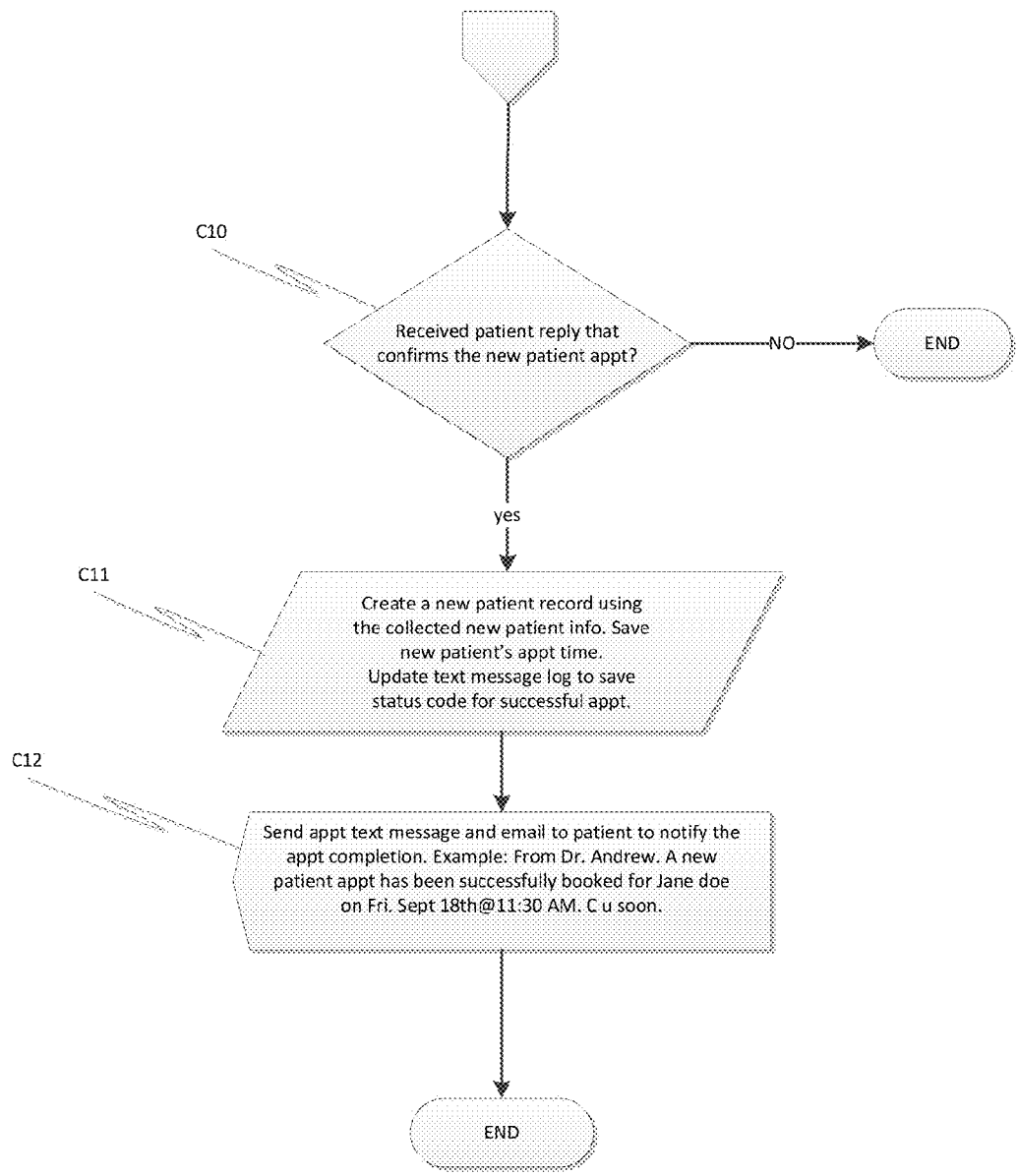
Figure 5C: New pateint appointment by text, part 3

METHOD, A SYSTEM AND A SERVER FOR BUSINESS APPOINTMENT SCHEDULING USING TEXT MESSAGES

RELATED U.S. APPLICATION DATA

This application claims the benefit of U.S. Provisional Application No. 61/878,586, filed Sep. 16, 2013.

TECHNICAL FIELD

The present disclosure relates to the field of scheduling systems. More specifically, the present disclosure relates to use of text messaging for scheduling of business appointments.

BACKGROUND

A professional, for example a doctor, leads a very busy life and has limited time to devote to tasks related to scheduling patient appointments, making reminder calls, and dealing with late arrivals or no-shows from patients.

An assistant to the professional is constantly multi-tasking and needs to deal with time-consuming, repetitive tasks such as taking, modifying or cancelling appointments, and dealing with emergencies.

A client, for example the patient of a doctor, oftentimes needs to wait on-hold to speak to the doctor's assistant, leaving voice mail messages with little guarantee that the messages will be timely handled.

Existing web appointment booking allows client 24/7 self-service appointment scheduling. But such service is time-consuming and not user friendly. Because most people cannot easily find their service provider's web page address or remember their account login with these websites.

Therefore, there is a need for improvements in the field of appointment scheduling solutions.

SUMMARY

According to the present disclosure, there is provided a business appointment scheduling method. A server receives, from a mobile terminal, an initial text message having been transmitted over a wireless network, the initial text message including a function keyword. The server determines, based on the function keyword, a type of requested service. Based on the type of requested service and mobile Identification, the server creates a unique page identification for a scheduler page. The server transmits toward the mobile terminal over the wireless network, a reply text message including the unique page identification. The server detects an access of the scheduler page by the mobile terminal, the access including an entry of appointment data. The server schedules an appointment in the scheduler page using the entered appointment data.

According to the present disclosure, there is also provided a business appointment scheduling system. The system comprises a gateway, a database and a server operatively connected to the gateway and to the database. The gateway is in communication with mobile terminals over a wireless network. The database stores appointment information in scheduler pages. The server is also in communication with the mobile terminals over the wireless network. The server is configured to:
  receive from the gateway, a content of an initial text message identifying a mobile terminal, the content message including a function keyword;
  determine, based on the function keyword, a type of requested service;
  create, based on the type of requested service and mobile identification, a unique page identification for a scheduler page;
  request the gateway to transmit toward the mobile terminal a reply text message including the unique page identification;
  detect an access of the scheduler page by the mobile terminal, the access including an entry of appointment data;
  schedule an appointment in the scheduler page, using the entered appointment data;
  request the database to store the appointment in the scheduler page.

According to the present disclosure, there is also provided a business appointment scheduling server. The server includes an interface capable of communicating toward mobile terminals over a wireless network, a processor, and a non-transient processor-readable storage medium having stored thereon executable instructions. When executed by the processor the instructions:
  receive, over the wireless network, a content of an initial text message identifying a mobile terminal, the content message including a function keyword;
  determine, based on the function keyword, a type of requested service;
  create, based on the type of requested service and mobile identification, a unique page identification for a scheduler page;
  request the wireless network to transmit toward the mobile terminal a reply text message including the unique page identification;
  detect an access of the scheduler page, by the mobile terminal via the interface, the access including an entry of appointment data;
  schedule an appointment in the scheduler page, using the entered appointment data; and
  request a database to store the appointment in the scheduler page.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 1 is a system overview with its physical components according to an embodiment.

FIG. 2 is an overview of three software modules that share implementation tasks of the scheduling applications FIGS. 3A and 3B are flow charts that explain function control logics for a patient to reschedule appointment by text message.

FIGS. 4A, 4B and 4C are flow charts that explain function control logics for an existing patient to reschedule or add new appointment by text message.

FIGS. 5A, 5B and 5C are flow charts that explain the function control logics for a new patient to book a doctor appointment by text message.

Like numerals represent like features on the various drawings.

DETAILED DESCRIPTION

A text message based business appointment scheduling system is provided. The system can be used by doctor offices, hair salons, restaurant or hotel reservation, and other business where services are offered by appointments or reservation.

With this system, a mobile phone user starts the appointment scheduling by sending a text message with a function keyword, unique patient id, or unique practitioner (e.g. doctor id) to a virtual mobile phone number assigned to the business office for scheduling.

When receiving such text message, the system creates a scheduler page URL with a unique scheduler page id and sends it as text message reply to the mobile phone end user.

The unique URL is designed to allow the system to display a scheduler page with selective data that target the user's request. The unique URL may be created based on a unique identification number of the mobile phone of the user.

Once the mobile end user has made the selection of appointment data from the scheduler page with unique id, the system first authenticates the access by requesting the mobile user to confirm the scheduling transaction with text message reply. The system will save the appointment data after a confirmation is received by text message from the same mobile phone that initiated the scheduling request.

The following terminology is used throughout the present disclosure:

SMS: This term stands for Short Message Service.
HTTPS: This term stands for Hyper Text Transfer Protocol Secured.
API: This term stands for Application Programming Interface.
SQL: This term stands for Structured Query Language.
Virtual Mobile Number: also known as Long number (e.g. +44 7624 80055 [International] or 757 772 8555 [US]), a dedicated phone number or long code, is a reception mechanism used by businesses to receive SMS messages and voice calls.
URL: This term stands for Uniform Resource Locator, also known as "web address", is a specific character string that constitutes a reference to a web page or resource.
JSP: JavaServer Pages (JSP) is a technology that creates dynamically generated web pages based on HTML, XML, or other document types.
JAVA: Java is a general-purpose, concurrent, class-based, object-oriented computer programming language.
MOBILE TERMINAL: a cellular telephone, a mobile phone, an intelligent mobile terminal, and like personal communicating device capable of transmitting and receiving text messages.
WIRELESS NETWORK: a cellular network, a GSM network, 3G network, a LTE network, a personal communications service network, a Wimax network and like networks using over the air transmission.

Operation

Max Allowed Time to Reply By End User

Due to the time sensitivity of appointment data, an implementation imposes a time window for end user to reply to a text message from the scheduling system so the ongoing scheduling transaction can be complete within a reasonable time frame.

For this purpose, a configurable max_reply_time is used to determine if a text message reply is received "late".

Using a time stamp saved in a text message log to record the time when system initially sends the message, a reply received after the max_reply_time window is considered "late" and should be discarded. The ongoing scheduling function ends without any changes made to the schedule data.

Unique Scheduler Page Id

Unique scheduler page id is used by scheduling system to identify an ongoing appointment transaction. Specifically, the unique scheduler page id is used to identify the text message log record that contains data related to an appointment transaction.

There can be many ways of creating a unique scheduler page id. For example, a new unique scheduler page id may be created, by adding integer 1, to the last created unique scheduler page id.

Unique Patient Id

This is an id designed to uniquely identify a patient's record in the system.

There can be many ways of creating a unique patient id. For example, if a patient record's database id is unique, then a unique patient id may be created by encrypting the database id. Patient's name, combined with other identification info such as mobile Id on patient record, can also be used to uniquely identify a patient record When the encrypted patient id is used as unique patient id, to identify the patient, the encrypted patient id will be decrypted first to obtain the patient record database id. The patient's database record can then be read using the patent record database id.

In the scope of this document, the term "patient id" and "unique patient id" will share the same meaning and definition.

Unique Doctor Id

This is an id designed to uniquely identify a doctor's record in the system.

There can be many ways of creating a unique doctor id. For example, if a doctor record's database id is unique, then a unique doctor id may be created by encrypting the database id. If a doctor is assigned a unique virtual mobile number to receive text message from his patients, then the virtual mobile number can also be used as unique doctor id. However, in the embodiments presented by this application, we assume the virtual mobile number is shared between multiple doctors.

When the encrypted doctor id is received as unique doctor id, to identify the doctor, the encrypted doctor id will be decrypted first to obtain the doctor record database id. The doctor's database record can then be read using the doctor record database id.

In the scope of this document, the term "doctor id" and "unique doctor id" will share the same meaning and definition.

Text Message Function Keywords

When end user sends a text message to request an appointment, a pre-defined keyword is necessary for the system to determine what type of service is requested.

Some key words are offered "on-the-fly" to end user in the text message. Example " . . . Reply RESCHEDULE to reschedule your appt".

Other key words are pre-defined and published so that they are available to end user as condition for the service. For example, a doctor can publish his appointment info indicating To make a new patient appointment, send text message "newpt 7656", or "new patient appt with Dr. Andrew Smith" to my virtual mobile number 987.789.7654

To make an existing patient appointment, send text message "7656", or "appt for your_first_name" to my virtual mobile number 987.789.7654

Where the "newpt", "new patient appt" are the required key words for new patient appointment and the id "7656", or "Dr. Andrew Smith" are the unique doctor id for this doctor.

Example Implementation

An implementation example will now be provided.

Description of the example starts with a system overview with the description of its physical components.

The "Software Modules Overview" section describes the three core software modules that implement the methods for booking appointment by text message.

The "Implementation Description" section is a step by step description on how to implements function that allows a mobile phone end user to Reschedule an appointment when receive text reminder Schedule an appointment as an existing patient by text message.

Schedule an appointment as a new patient by text message.

System Overview

In FIG. 1, an overview of the system is shown with representative physical components. FIG. 1 shows:

A mobile phone user 10.

A SMS gateway 13 having a processor

A Web application server 15 having a processor

A back end relational database 17 where the system keeps appointment scheduling data The SMS gateway communicates with mobile phone user via SMS protocol 11 over wireless network.

The web application server 15 communicates with mobile phone user via HTTPS 12 over wireless network.

The SMS gateway 13 communicates with the web application server 15 using SMS gateway API 14.

The web application server 15 accesses the back end relational database via SQL 16.

The end user 10 uses a mobile phone to send text message to a predefined virtual mobile number assigned to scheduling function. The end user 10 may also open and browse a scheduler page during the scheduling process to select or input appointment data.

When end user 10 sends or receives text messages, the SMS gateway 13 acts as a "messenger" that passes the text messages between the end user 10 and the web application server 15. On one side, it uses SMS protocol 11 over wireless connection to communicate with the end user 10, and on the other side it uses SMS gateway API 14 to communicate with the web application server 15.

When end user 10 browses a scheduler page using a unique URL, it communicates with web application server 15 via HTTPS protocol 12 over wireless connection. The web application server 15 includes an interface communicating with the end user 10 over a wireless network. The end user 10 can open a web page using the page's URL, select appointment data, and click submit button on the web page to submit a web request using connection 12.

The web application server 15 is the controlling component of this system. It stores the application software that implement the scheduling function logics described by FIGS. 3A, 3B, 4A, 4B, 4C, 5A, 5B and 5C.

The web application server 15 uses SMS gateway API 14 to send and receive text message from end user 10. In addition, it will serve the web requests from end user 10 via Internet protocol HTTPS 12.

The back end database 17 stores scheduling data. At different operations of the implementation, the web application server 15 searches and modifies data in the back end relational database 17 via standard SQL 16.

Because the SMS gateway services are commercially available and can be easily obtained from companies such as twilio.com and nexmo.com, the implementation of SMS protocol 11, the SMS gateway 13, and the SMS gateway API 14 is not discussed further herein. Instead, in an example implementation assumes that the web application server uses nexmo.com SMS gateway and its published java API 14. (see Reference 1).

In addition, because the Internet protocol HTTPS 12 and relational database access standard SQL 16 are widely used as standard components of a web application, their implementations are well known and are not discussed in details.

Software Modules Overview

The web application server 15 includes a processor and a non-transient processor-readable storage medium having stored thereon executable instructions that, when executed by the processor, perform features of three software modules of FIG. 2. FIG. 2 shows the three software modules located inside the web application server 15. In FIG. 2:

The End User Module 21 controls the communication with a user's mobile phone. This module implements SMS gateway API 14 in order to receive and send text message to a mobile end user. This module also handles end user's HTTPS web page request with unique URL.

The function Control Module 22 implements the controlling logics of the example embodiments. It uses the User Module 21 to send and receive text messages or respond to a user's web page request. And it uses the Data Manager module 23 to search and save scheduling data.

The Data Manager Module 23 deals with access to relational database. It receives order from the Control Module 22 and will read and write data to the database.

These three modules work together to enable the functions for appointment scheduling by text messages.

Some embodiments use Java and JSP to implement these software modules.

The end user module 21 is responsible for communicating with an end user 10 by text message and sending response to an end user's web page requests. This module uses the SMS server API 14 to send and receive text message from the end user 10. It uses HTTPS 12 to serve user's web requests.

The data manager module 23 is responsible to search or modify the scheduling data in the back end relational database using SQL 16.

In order for the system to apply the correct controlling logics, data manager 23 creates or updates a text message log before a text message is sent to user so that a reply from the end user can be identified in the context of an ongoing transaction.

When applicable, a text message log may include some or all of the data listed below Time stamp on the log's creation.

End user's cell phone number

Patient id (used to retrieve patient record that includes doctor's unique id, patient service profile, and patient email).

Doctor id (used to retrieve doctor record that include doctor's service profile, doctor's new patient form, and doctor's email)

Unique scheduler id used in the text message

Appointment id (used to retrieve patient's appointment info)

Status code indicating the "milestone" of an appointment transaction (Example, reschedule initiated, reschedule pending confirmation).

The control module 22 implements the function logics for the methods of scheduling by text message. At different operations of the implementation, it uses the end user module 21 to communicate with the end user and the data manager 23 to read and update schedule data.

Scheduling appointment by text message is a multi-operations process initiated by end user. In a typical operation, when end user module 21 receives a request or reply, it sends the request to the control module 22 for processing.

The control module 22 first orders the data manager module 23 to match the request with a previously store text message log using received mobile phone number or unique scheduler id.

Based on the data stored on the text message log, the control module 22 will prepare a reply message and request the end user module 21 to send the reply to the user. When it is necessary to modify a text message log or update schedule data record, it will do so via data manager module 23.

Example Implementation Description

This section represents a step-by-step implementation description for

Function "Reschedule on Text Reminder" described by FIGS. 3A, and 3B.

Function "Existing Patient Appointment by Text", described by FIGS. 4A, 4B, and 4C Function "Booking New Patient Appointment by Text", described by FIGS. 5A, 5B, and 5C How to Implement Function for Reschedule on Text Reminder, FIGS. 3A and 3B In this implementation a patient is used as a mobile end user example. Upon receiving the text message reminder for a doctor appointment, the patient chooses to reschedule the appointment by text message.

Pre-Conditions for the Function:

The patient has already booked an appointment.

The patient has cell phone number on record so the system is going to send a text message appointment reminder.

Operation A1: The control module 22 orders the data manager 23 to create a text message log. The log includes A time stamp indicating the time of the log creation.

The patient's mobile number.

Patient's id.

Doctor's id.

The current appointment id.

A status code indicating "appt reminder delivered"

Operation A2: The control module 22 then orders the end user module 21 to send text message reminder for the patient. The text message offers option for reschedule. For example, "From Dr. Andrew: Jane Doe has an appointment at Tues Sept 15@11:30 AM, reply YES, CANCEL, or RESCHEDULE".

This reschedule function ends when patient does not reply, or reply with a keyword other than "RESCHEDULE".

Operation A3: When a text message with keyword "RESCHEDULE" is received. The message object received in the end user module 21 contains a message sender's cell phone number.

Using data manager 23, the control module 22 will first attempt to find the text message log created in operation A1 that Has the newest time stamp Match the cell number received in A3.

Has the status code indicating "appt reminder delivered".

Using the time stamp on the log and a pre-defined time window (refer to "Operation" for "Max allowed time to reply by end user"), the time of the reply is validated. A late reply is discarded. The scheduling function ends without any data modification.

Operation A4: If the reply is valid, the control module 22 will create a patient appointment reschedule URL with a unique scheduler page id. The control module 22 will also orders the data manager 23 to modify the text message log created in operation A1. The modified text message log now includes the unique scheduler page id, a time stamp indicating the time of the log creation, the patient's mobile number, patient's id, doctor's id, patient's current appointment id and a status code indicating "reschedule initiated".

Operation A5: The control module 22 then orders the end user module 21 to send text message to the patient's cell phone. The text message instructs the patient to visit the unique reschedule page. For example, "From Dr. Andrew: To choose a new appt time open this page:

https://www.mysite.com/mobileResch/uniqueURL.jsp?id=abcde"

Operation A6: The patient's web request to display the URL with the unique scheduler page id is received from the end user module 21.

The control module 22 will first order the data manager 23 to identify the previously saved text message log using the unique scheduler page id.

Using the time stamp on the log and a pre-defined time window (refer to "Operation" for "Max allowed time to reply by end user), the time of the reply is validated. A late reply is discarded. The scheduling function ends without any data modification.

Using the data retrieved from patient id, doctor id, appointment id and unique scheduler page id on the text message log, the control module 22 will create a reschedule page with available time slots for appointment reschedule. The end user module 21 displays the reschedule page on user's cell phone.

Operation A7: On the unique reschedule page, the patient chooses a new appointment time and submits the web request for reschedule. The submitted web request includes a new appointment id, the patient id, the doctor id the unique scheduler page id.

Operation A8: The control module 22 will first order the data manager 23 to identify the previously saved text message log using the unique scheduler page id.

Operation A9: The control module 22 will then order the data manager 23 to updates the text message log. The modified text message log now includes the unique scheduler page id, a time stamp indicating the time of the log creation, the patient's mobile number, the patient's id, the doctor's id, the current appointment id, the new appointment id
a status code indicating "reschedule pending for text confirmation".

Operation A10: The control module 22 then orders the end user module 21 to send text message to the patient's cell phone. The text message instructs patient to confirm the reschedule. For example, "From Dr. Andrew: Jane Doe has rescheduled an appt to Tues Sept 18@11:30 AM, reply YES to confirm, or NO to keep the current appt".

Operation A11: When a "YES" text message is received, the message object received in the end user module 21 contains the message sender's cell phone number.

Using data manager 23, the control module 22 will first attempt to find the text message reminder log that
Has the newest time stamp
Match the patient's cell number.
Has a status code indicating "reschedule pending for text confirmation" as marked in operation A9.

Using the time stamp on the log and a pre-defined time window (refer to "Operation" for "Max allowed time to reply by end user), the time of the reply is validated. A late reply is discarded. The scheduling function ends without any data modification.

Operation A12: This reschedule function ends when patient does not reply, or replies with keyword other than "YES".

Operation A13: When the confirmation reply is valid, using the data on the text message log, the control module 22 will order the data manager 23 to
Save the new appointment id for the patient,
Release the current(old) appointment time slot so it can be available to other patients,
Modify the status code of the text message log to indicate "reschedule confirmed".

Operation A14: The control module 22 then orders the end user module 21 to send text message to the patient's cell phone notifying the reschedule completion. For example, "From Dr. Andrew: Rescheduled successfully your appt to Tues. Sept 18@11:30 AM. C u soon".

For record keeping and added security, a reschedule confirmation email will be sent to the patient's email address.

The function ends.

How to Implement Function for Existing Patient Appointment by Text, FIGS. 4A, 4B, and 4C The FIGS. 4A, 4B, and 4C teach the implementation of the function logics for an existing patient to schedule a doctor appointment by text message.

Pre-Conditions for the Function:
The patient has a unique patient id.
The patient has cell phone number on record.
A virtual mobile number (refer to the section "Definition of the Terms") has been assigned to the doctor's scheduler account. The virtual mobile number is reserved for booking patient appointment by text message.

Using reserved virtual mobile number to access a doctor's scheduler creates two significant advantages compare to web-based self-service scheduling. The first advantage is that patients can now easily save the virtual mobile number in their mobile phone contact book as a regular "doctor's number for appointment". They no longer have to search or memorize their doctor's website domain name. They can now book appointment from mobile phone, any time, without the need of a computer with internet access. The second advantage is that the authentication of the patient access is now performed based on mobile identity instead of manual account user login.

As a result, the access to the scheduling function is much more quicker and user-friendly.

When a patient needs a doctor appointment, he/she can simply find the "doctor's appointment number" (virtual mobile number) from his/her mobile phone contact book, send a text message containing his/her own unique patient id (example jane8789, or "appt for Jane Doe").

Operation B1: When a text message with unique patient id such as "jane8789" is received, the message object received in the end user module 21 contains the message sender's cell phone number and the virtual mobile number to which the text was sent.

Operation B2: If the virtual mobile number is assigned to patient appointment scheduling, using data manager 23, the control module 22 will first attempt to get the patient record that matches the unique patient id.

Operation B3: The text message will be discarded if the cell phone number on the patient record does not match the number received in operation B1. The scheduling function ends without any data modification.

Operation B4: If the text message is valid, the control module 22 will create a patient appointment scheduler page URL using a unique scheduler page id.

The control module 22 will then orders the data manager 23 to create a text message log that includes
the unique scheduler page id,
a time stamp indicating the time of the log creation,
the patient's mobile number,
patient's id,
doctor's id (retrieved using patient id)
a status code indicating "appointment scheduling by text initiated".

Operation B5: The control module 22 then orders the end user module 21 to send text message to the patient's cell phone. The text message instructs the patient to visit the unique scheduler page specified by the URL. For example, "From Dr. Andrew: To choose a new appt time open this page:
https://www.mysite.com/mobileAppt/unique URL.jsp?id=abcde".

Operation B6: The patient's web request to display the URL with the unique scheduler page id is received from the end user module 21.

The control module 22 will first order the data manager 23 to identify the previously saved text message log using the unique scheduler page id.

Using the time stamp on the log and a pre-defined time window (refer to "Operation" for "Max allowed time to reply by end user"), the time of the reply is validated. A late reply is discarded. The scheduling function ends without any data modification.

Using the unique scheduler page id, patient id, doctor id saved in the text message log, the control module 22 will create a schedule page with
Patient's current appointments with function buttons next to each current appointment. Patient can submit a current appointment for reschedule or cancellation.
Doctor's available time slots for existing patient appointment.

The end user module 21 displays the schedule page on patient's cell phone.

Operation B7: On the unique scheduler page, the patient chooses an appointment time and submits the web request for new appointment. The submitted web request includes a new appointment id,
  the current appointment id (if patient has check-marked an current appointment for reschedule or cancellation)
  the patient id,
  the doctor id
  the unique scheduler page id.

Operation B8: The control module 22 will first order the data manager 23 to identify the previously saved text message log using the unique scheduler page id.

Operation B9: The control module 22 determines if the request is to reschedule a current appointment or add a new appointment.

Operation B10: If the request is to reschedule a current appointment, the control module 22 will process the reschedule request by repeating the same process described on "FIG. 3B: Reschedule on text reminder", operations A9-A14 (see page 11).

Operation B11: If the request is to add a new appointment, the control module 22 will order the data manager 23 to modify the text message log identified in operation B8. The modified log now includes
  the unique scheduler page id,
  a time stamp indicating the time of the log creation,
  the patient's mobile number,
  the patient's id,
  the doctor's id,
  the new appointment id received in operation B7.
  modified status code indicating "appointment pending for text confirmation".

Operation B12: The control module 22 then orders the end user module 21 to send text message to the patient's cell phone. The text message instructs the patient to confirm the appointment by text message reply. For example, "From Dr. Andrew: Jane Doe has scheduled an appt on Tues Sept 18@11:30 AM, reply YES to confirm, or NO to Cancel".

If the patient does not reply, or replies using a keyword other than "YES", the scheduling function ends without any data modification.

Operation B13: When a "YES" text message is received from the end user module 21, the message object received by end user module 21 contains the message sender's cell phone number.

Using data manager 23, the control module 22 will first attempt to find the text message reminder log that
  Has the newest time stamp
  Match the patient's cell number.
  Has a status code indicating "appointment pending for text confirmation" as marked in operation B8.
  Using the time stamp on the log and a pre-defined time window (refer to "Operation" for "Max allowed time to reply by end user), the time of the reply is validated. A late reply is discarded. The scheduling function ends without any data modification.

Operation B14: When the confirmation reply is valid, using the data on the text message log, the control module 22 will order the data manager 23 to
  Save the new appointment id for the patient.
  Update the status code of the log to indicate "Appointment confirmed".

Operation B15: The control module 22 then orders the end user module 21 to send text message to the patient's cell phone notifying the appointment booking completion. For example, "From Dr. Andrew: an appt on Tues. Sept 18@11:30 AM is booked for Jane doe. c u soon".

For record keeping and added security, an appointment booking confirmation email will be sent to the patient's email address.

The function ends.

How to Implement Function for New Patient Appointment by Text, FIGS. 5A, 5B, and 5C The FIGS. 5A, 5B, and 5C teach the implementation of the function logics for a new patient to schedule a doctor appointment by text message.

In the context of business appointment scheduling, a new patient (or a new customer) is different than an existing patient in that a new patient does not have a patient record or unique patient id associated with a doctor's account. Making a new patient appointment would typically involve collecting patient info before selecting an appointment time.

Pre-Conditions for the Function:
  The doctor has a unique doctor id that is published to the new patients
  The new patient has cell phone.
  A virtual mobile number (refer to the section "Definition of the Terms") has been assigned to the doctor's scheduler account and this number is reserved for booking appointment by text message.
  New patients have been instructed to send text message to request new patient appointment using a pre-defined, published keyword such as "newpt" combined with the unique doctor id.

Thus when a new patient needs a doctor appointment, he/she can simply be referred to the "doctor's appointment number" (virtual mobile number) by friends or family. To request a new patient appointment, he/she sends a text message containing the unique doctor id and a pre-defined published keyword for new patient appointment (example "newpt 7658", or "new patient appt with Dr. Andrew Smith").

Operation C1: When a text message is received with unique doctor id and new patient appointment request keyword (example such as "newpt 7658"), the message object received by the end user module 21 includes the message sender's cell phone number and the virtual mobile number where the text is received.

Operation C2: If the virtual mobile number received in C1 is not assigned to patient appointment scheduling, the function ends without data modification.

If the virtual mobile number is previously assign to patient appointment scheduling, using data manager 23, the control module 22 will attempt to get the doctor record that matches the unique doctor id.

Operation C3: The request will be rejected if the doctor's service profile indicates that the doctor is unable to accept new patients. In this case the control module 22 uses the end user module 21 to send a customized text message to notify the failure reason and offers alternative (example, to refer patient to another doctor).

For example, "From Dr. Andrew: No new patient appt available. We'd like to refer you to Dr. Johnson. Tel: 987.876.5434". (Dr. Johnson and his phone number is saved on Dr. andrew's record as alternative offer for new patient appointment in case of no-availability.)

Operation C4: If new patient appointments are available, the control module 22 will create a new patient appointment scheduler page URL with a unique scheduler page id.

The control module 22 will also orders the data manager 23 to create a text message log. The new log includes
  the unique scheduler page id,
  a time stamp indicating the time of the log creation,
  the patient's mobile number received in operation C1,
  doctor's id (identified in operation C2)
  a status code indicating "new patient appt by text initiated".

Operation C5: The control module 22 then orders the end user module 21 to send text message to the patient's cell phone. The text message instructs the patient to visit the unique scheduler page. For example, "From Dr. Andrew: To choose a new patient appt time open this page:
https://www.mysite.com/mobile/newpt/
uniqueURL.jsp?id=abcde".

Operation C6: The patient's web request to display the new patient scheduler page URL with the unique scheduler page id is received from the end user module 21.

The control module 22 will first order the data manager 23 to identify the previously saved text message log using the unique scheduler page id.

Using the time stamp on the log and a pre-defined time window (refer to "Operation" for "Max allowed time to reply by end user"), the time of the reply is validated. A late reply is discarded. The scheduling function ends without any data modification.

Using the doctor id, and the unique scheduler page id, the control module 22 will create a new patient schedule page.

The end user module 21 displays the new patient schedule page on the new patient's cell phone. The new patient appointment page contains information retrieved from the doctor's id including
unique scheduler id
Available appointment time for new patient
Question form for new patient (retrieved using doctor id)

Operation C7: On the unique scheduler page, the patient fills the new patient form and chooses appointment time. The patient then submits the web request. The web request includes
the new appointment id,
the patient information collected by the new patient form,
the doctor id
the unique scheduler page id.

Operation C8: When the request is received, the control module 22 will first order the data manager 23 to identify the previously saved text message log using the unique scheduler page id.

The data manager 23 is then ordered to modify the text message log. The modified log now includes
the unique scheduler page id,
a time stamp indicating the time of the log creation,
the patient's mobile number,
the doctor's id,
the new appointment id received in operation C7.
the collected patient info received in C7
a status code indicating "new appointment pending for text confirmation".

Operation C9: The control module 22 then orders the end user module 21 to send text message to the patient's cell phone. The text message instructs the patient to confirm the appointment by text message. For example, "From Dr. Andrew: Jane Doe has scheduled an new patient appt on Tues Sept 18@11:30 AM, reply YES to confirm, or NO to Cancel".

This function ends when patient does not reply, or replies using a keyword other than "YES".

Operation C10: When a "YES" text message is received from the end user module 21, the message object received by end user module 21 contains the message sender's cell phone number.

Using data manager 23, the control module 22 will first attempt to find the text message log that
Has the newest time stamp
Match the patient's cell number.
Has a status code indicating "new appointment pending for text confirmation" as marked in operation C8.

Using the time stamp on the log and a pre-defined time window (refer to "Operation" for "Max allowed time to reply by end user"), the time of the reply is validated. A late reply is discarded. The scheduling function ends without any data modification.

Operation C11: When the confirmation reply is valid, using the data on the text message log, the control module 22 will order the data manager 23 to
Create a new patient record using the patient information saved on the text message log in operation C8.
Save the new appointment id for the patient.
Update the status code on text message log to indicate "New patient Appointment confirmed".

Operation C12: The control module 22 then orders the end user module 21 to send text message to the patient's cell phone notifying the new patient appointment booking completion. For example, "From Dr. Andrew: a new patient appt on Tues. Sept 18@11:30 AM is booked for Jane Doe. c u soon".

For record keeping and added security, a new patient appointment booking confirmation email will be sent to the patient's email address.

The function ends.

Those of ordinary skill in the art will realize that the description of the method and system for business appointment scheduling are illustrative only and are not intended to be in any way limiting. Other embodiments will readily suggest themselves to such persons with ordinary skill in the art having the benefit of the present disclosure. Furthermore, the disclosed method and system may be customized to offer valuable solutions to existing needs and problems of existing scheduling solutions.

In the interest of clarity, not all of the routine features of the implementations of method and system are shown and described. It will, of course, be appreciated that in the development of any such actual implementation of the method and system, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of scheduling systems having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

REFERENCES

1) A prototype implementation uses nexmo.com as SMS Gateway service provider. The implementation examples and tutorial of the nexmo service API can be found online on https://docs.nexmo.com/

What is claimed is:

1. A business appointment scheduling method, comprising:
   automatically initiating an appointment scheduling process at a server in response to receiving, at the server, an initial text message having been transmitted over a wireless network from a mobile terminal associated with a user, the initial text message including a function keyword;
   determining at the server, based on the function keyword, a type of requested scheduling service;
   creating at the server, based on the type of requested scheduling service, a unique page identification for a scheduler page;
   creating, at the server, a text message log record including data related to an appointment transaction, the data including at least the unique page identification;
   generating a reply text message based on the data included in the text message log record, wherein the reply message includes a link to the scheduler page, the link generated using the unique page identification;
   transmitting the reply text message, from the server toward the mobile terminal over the wireless network;
   serving the scheduler page to the mobile terminal in response to the link being activated;
   detecting, at the server, an access of the scheduler page by the mobile terminal, the access including an entry of appointment data; and
   scheduling an appointment in the scheduler page, by the server using the appointment data.

2. The method of claim 1, wherein the text message received from the mobile terminal is sent to a long code virtual mobile number, and includes a unique user identification.

3. The method of claim 2, comprising authenticating the mobile terminal using the unique user identification before updating the scheduler page.

4. The method of claim 3, wherein authenticating the mobile terminal comprises:
   transmitting, from the server toward the mobile terminal over the wireless network, a further text message requesting authentication; and
   receiving, at the server, an authenticating text message from the mobile terminal.

5. The method of claim 2, wherein the unique page identification is created based on the unique user identification.

6. The method of claim 1, wherein the initial text message includes a unique identification of a service provider.

7. The method of claim 1, wherein the function keyword designates a request for scheduling a new appointment.

8. The method of claim 1, wherein the function keyword designates a request for modifying an existing appointment, the access including a modification of data related to the existing appointment.

9. The method of claim 1, comprising transmitting, from the server toward the mobile terminal over the wireless network, a reminder text message related to a previously scheduled appointment.

10. The method of claim 9, wherein the server transmits the reminder text message at a predetermined time advance before a time of the previously scheduled appointment, the method further comprising:
    initiating a timer upon transmitting the reminder text message; and
    if a text reply to the reminder text message is received at the server, from the mobile terminal, before expiry of the timer, confirming, modifying or cancelling the previously scheduled appointment based on a new function keyword included in the text reply.

11. The method of claim 10, comprising:
    determining, at the server, that the new function keyword indicates a request to modify the previously scheduled appointment;
    creating, at the server, a unique page identification for a reschedule page;
    transmitting, from the server toward the mobile terminal over the wireless network, a further reply text message including the unique page identification for the reschedule page;
    detecting, at the server, an access of the reschedule page by the mobile terminal, the access including an entry of a modification to the previously scheduled appointment; and
    rescheduling the previously scheduled appointment, by the server, using the modified appointment data.

12. A business appointment scheduling system, comprising:
    a gateway in communication with mobile terminals over a wireless network;
    a database storing appointment information in scheduler pages;
    a server in communication with the mobile terminals over the wireless network, the server being operatively connected to the gateway and to the database, the server being configured to:
       automatically initiating an appointment scheduling process in response to receiving, from the gateway, a content of an initial text message identifying a mobile terminal, the content including a function keyword;
       determine, based on the function keyword, a type of requested scheduling service;
       create, based on the type of requested scheduling service, a unique page identification for a scheduler page of the database;
       create a text message log record including data related to an appointment transaction, the data including at least the unique page identification;
       generate a reply text message based on the data included in the text message log record, wherein the reply message includes a link to the scheduler page, the link generated using the unique page identification;

request the gateway to transmit toward the mobile terminal the reply text message—including the link;

serve the scheduler page to the mobile terminal in response to the link being activated;

detect an access of the scheduler page by the mobile terminal, the access including an entry of appointment data;

schedule an appointment in the scheduler page, using the appointment data; and request the database to store the appointment in the scheduler page.

13. The system of claim 12, wherein the server includes a processor and a non-transient processor-readable storage medium having stored thereon executable instructions that, when executed by the processor:

control communication of the server with the mobile terminal;

control interactions of the server with the gateway and with the database; and control the scheduling of the appointment in the scheduler page.

14. The system of claim 13, wherein:

an end user software module controls the communication of the server with the mobile terminal directly and through the gateway;

a data manager module control interactions of the server with the database; and a control module controls the scheduling of the appointment in the scheduler page.

15. The system of claim 14, wherein the data manager creates a log for each text message exchanged between the system and the mobile terminal.

16. The system of claim 15, wherein the log includes a status code for an appointment.

17. A business appointment scheduling server, comprising:

an interface capable of communicating toward mobile terminals over a wireless network;

a processor; and a non-transient processor-readable storage medium having stored thereon executable instructions that, when executed by the processor:

automatically initiating an appointment scheduling process in response to receiving, from a gateway, a content of an initial text message identifying a mobile terminal, the content including a function keyword;

determine, based on the function keyword, a type of requested scheduling service;

create, based on the type of requested scheduling service, a unique page identification for a scheduler page;

create a text message log record including data related to an appointment transaction, the data including at least the unique page identification;

generate a reply text message based on the data included in the text message log record, wherein the reply message includes a link to the scheduler page, the link generated using the unique page identification;

request the gateway to transmit toward the mobile terminal a reply text message including the link generated using the unique page identification;

serve the scheduler page to the mobile terminal in response to the link being activated;

detect an access of the scheduler page, by the mobile terminal via the interface, the access including an entry of appointment data;

schedule an appointment in the scheduler page, using the appointment data; and request a database to store the appointment in the scheduler page.

18. The business appointment scheduling server of claim 17, wherein the server is a web server.

19. The business appointment scheduling server of claim 17, wherein the business appointment server is further configured to use the unique page identification to identify the text message log record.

20. The business appointment scheduling server of claim 17, wherein the text message log record the text message log record includes a patient identifier and a practitioner identifier.

* * * * *